(12) United States Patent
Grobbel

(10) Patent No.: US 8,617,014 B2
(45) Date of Patent: Dec. 31, 2013

(54) DRIVE MEANS AND CHAIN DRIVE WITH POLYGONAL COMPENSATION

(75) Inventor: Burkhard Grobbel, Schmallenberg (DE)

(73) Assignee: Ketten-Wulf Betriebs-GmbH, Eslohe-Kueckelheim (DE)

( * ) Notice: Subject to any disclaimer, the term of this patent is extended or adjusted under 35 U.S.C. 154(b) by 243 days.

(21) Appl. No.: 12/743,302

(22) PCT Filed: Nov. 14, 2008

(86) PCT No.: PCT/EP2008/009653
§ 371 (c)(1),
(2), (4) Date: Jun. 4, 2010

(87) PCT Pub. No.: WO2009/062734
PCT Pub. Date: May 22, 2009

(65) Prior Publication Data
US 2010/0255944 A1  Oct. 7, 2010

(30) Foreign Application Priority Data
Nov. 16, 2007 (DE) .......................... 10 2007 055 065

(51) Int. Cl.
*F16H 7/12* (2006.01)
(52) U.S. Cl.
USPC ........................................................ 474/136
(58) Field of Classification Search
USPC .................. 474/133–137, 141, 148; 414/198; 198/329, 330, 813
See application file for complete search history.

(56) References Cited

U.S. PATENT DOCUMENTS

| | | | | |
|---|---|---|---|---|
| 613,756 A | * | 11/1898 | Buddle | 474/141 |
| 1,963,314 A | * | 6/1934 | Savell et al. | 198/797 |
| 2,945,393 A | * | 7/1960 | Paulson | 477/7 |
| 3,580,094 A | | 5/1971 | Kraus | |
| 4,416,647 A | * | 11/1983 | White, Jr. | 474/134 |
| 5,348,131 A | * | 9/1994 | Yamaguchi et al. | 198/330 |
| 5,820,503 A | * | 10/1998 | Bruchner et al. | 474/112 |
| 6,090,001 A | * | 7/2000 | Cantwell | 474/135 |

(Continued)

FOREIGN PATENT DOCUMENTS

| | | |
|---|---|---|
| CH | 148 573 | 7/1931 |
| DE | 199 26 615 A1 | 12/2000 |

(Continued)

*Primary Examiner* — William E Dondero
*Assistant Examiner* — Mark K Buse
(74) *Attorney, Agent, or Firm* — Laurence A. Greenberg; Werner H. Stemer; Ralph E. Locher

(57) ABSTRACT

Drive means for the polygonally-compensated drive of a sprocket, comprising two pulling means wheels (1, 2), a pulling means (3) running on them with an top span (31) and a bottom span (32), and a tensioning means acting on the pulling means (3), wherein the tensioning means comprises
  a first non-circular compensation wheel (4), which can come into contact with the top span (31),
  a second non-circular compensation wheel (5), which can come into contact with the bottom span (32),
  a rocker (6) adapted for rotatably receiving the first compensation wheel (4) and the second compensation wheel (5), wherein
  the rocker (6) is pivotably supported on a fixed bearing.
The invention also relates to a chain drive, comprising at least a sprocket (7), a drive means, wherein the sprocket (7) is driven by the drive means, wherein the drive means is a drive means according to at least one of the claims 1 to 17.

22 Claims, 6 Drawing Sheets

(56) References Cited

U.S. PATENT DOCUMENTS

| | | | |
|---|---|---|---|
| 6,167,686 B1* | 1/2001 | Becker et al. | 56/17.3 |
| 6,648,783 B1 | 11/2003 | Bogner | |
| 6,685,004 B2* | 2/2004 | Fargo et al. | 198/330 |
| 7,044,875 B2* | 5/2006 | Gajewski | 474/148 |
| 7,320,393 B2* | 1/2008 | Aulanko et al. | 198/330 |
| 7,720,650 B2* | 5/2010 | Gajewski | 703/1 |
| 2003/0060315 A1* | 3/2003 | Jiang | 474/141 |
| 2003/0104886 A1 | 6/2003 | Gajewski | |
| 2006/0073926 A1* | 4/2006 | Kelm et al. | 474/141 |
| 2009/0241291 A1 | 10/2009 | Smart | |
| 2010/0197433 A1* | 8/2010 | Gajewski | 474/141 |

FOREIGN PATENT DOCUMENTS

| | | |
|---|---|---|
| DE | 10 2006 036 353 A1 | 2/2008 |
| JP | 4531971 U | 12/1970 |
| JP | 5025905 U | 8/1975 |
| JP | 53115281 U | 9/1978 |
| JP | 3414420 U | 5/1994 |
| JP | 2003182957 A | 7/2003 |
| JP | 2005510677 A | 4/2005 |
| WO | 03/036129 A1 | 5/2003 |
| WO | 2005/012765 A1 | 2/2005 |
| WO | 2007/003329 A1 | 1/2007 |
| WO | 2007/092674 A1 | 8/2007 |

* cited by examiner

DRIVE MEANS AND CHAIN DRIVE WITH POLYGONAL COMPENSATION

BACKGROUND OF THE INVENTION

Field of the Invention

The present invention relates to a drive means for the polygonally-compensated drive of a sprocket and a chain drive.

To explain the terms "polygonal effect" and "polygonal compensation", the following is initially explained.

FIG. 1 schematically shows a sprocket chain G and a sprocket R partially wrapped around the latter. The sprocket chain G comprises chain links K linked to each other in a pin-jointed fashion via a pivot point P. The sprocket R shown in an exemplary manner, has 8 teeth Z, between which tooth gaps are arranged into which the pivot points P can engage. The angular pitch $\tau$ between two teeth or two tooth gaps is 45° in the example shown.

Furthermore, an entry angle $\phi$ is shown at the bottom side of the sprocket in FIG. 1, which can arise, for example, due to a guide for deflecting the sprocket chain G. The entry angle $\phi$ is measured between the actual exit direction of the sprocket chain G and the vertical S on the connecting line between detachment point A of the sprocket chain G from the sprocket R and the axis of rotation D of the sprocket R. The entry angle $\phi$ is about 11° in the example shown.

A momentary angle of wrap $\upsilon$ is indicated in FIG. 1, which corresponds to the circumferential angle between two detachment points A of the sprocket chain G from the sprocket R, and is equal to 180° in the case shown. When a chain link K detaches from the sprocket R, the momentary angle of wrap $\upsilon$ will be abruptly reduced, because with different entry angle $\phi$ at the top and bottom, a chain link K detaches at the top, for example, while at the same time the chain link K has not yet contacted the bottom, however. This is why an average angle of wrap $\upsilon$ will be assumed in the following, which is equal to or greater than the minimum angle of wrap and equal to or smaller than the maximum angle of wrap.

Furthermore, at the top of the sprocket R, an effective lever arm $H_{eff}$ is indicated, which corresponds to the vertical distance between the effective line W of force, in particular tensile force of the sprocket chain G and the rotary axis D of the sprocket R. Like the momentary angle of wrap $\upsilon$, the effective lever arm $H_{eff}$ also varies during the movement of the sprocket chain due to the detachment of the sprocket chain one link at a time, in particular due to the polygonal contact of the chain on the sprocket. At the bottom side of the sprocket R, the effective lever arm $H_{eff}$ is a bit shorter, since due to the slightly inclined effective line W of force of the sprocket chain G, the effective lever arm $H_{eff}$ does no longer extend through the detachment point A.

This results in the following drawbacks in the technical utilization of such a sprocket.

In escalators or moving sidewalks, their steps or pallets, are usually driven by conveyor chains, in particular on both sides, formed as so called step chains or pallet chains, and are also attached to the latter. Usually the conveyor chains have three or four subdivisions, i.e. three or four links per step. The sprockets used have about 16 to 25 teeth. This relatively high number is chosen to minimize the so called polygonal effect.

The polygonal effect is produced from the variations in the effective lever arm $H_{eff}$ (see FIG. 1). Sprockets are usually driven with constant angular velocity. Due to the variations in the effective lever arms, the velocity of the step chains also varies, the incessant acceleration and deceleration of the moved masses (chains, axles, steps) results in the generation of mass forces, which are transmitted as disturbing forces or torques into the step or pallet chain or into their drives, and lead to a shortened service life, or are a quantity which must be taken into account when designing the drive components, in particular. Moreover, the moving parts in an escalator combined with the surrounding steel structure, form a spring-mass system capable of vibration. The chains, in particular, can be seen as springs, and steps, axles (if any), rolls, the people transported (on the steps or pallets) and again the chains, are to be seen as masses. This spring-mass system can have very unfavorable operating points depending on the parameters, as a function of the number of teeth of the sprockets, the traversing velocity and the load.

To mitigate the polygonal effect in the state of the art, approaches for polygonal compensation are suggested.

In practice, this problem is usually solved by reducing the chain pitch and increasing the number of teeth. As the pitch is reduced and the number of teeth is increased, the polygonal effect is reduced, until a degree is reached, where the polygonal effect is so low in practice, i.e. the movement of the chains/steps/pallets is so uniform, that the polygonal effect causes practically no problem, but is still present.

Also, guides have been installed in the area of the sprockets, which effect tangential entry of the chain onto the sprockets. The primary aim of this measure is to reduce the entry noise of the chain on the sprockets. Also, the polygonal effect is reduced thereby, but not compensated.

The conventional structure with relatively small chain pitch and a relatively high number of teeth of the sprocket has substantial drawbacks, however.

First of all, the high cost of the chain for the steps or pallets is to be mentioned. The more subdivisions it has, the more links per step or per meter and the higher its cost. Moreover, there is a higher number of positions per step/pallet, subject to wear. Over the period of operation of the escalator, adherence to the maximum admissible spacing between steps/pallets for as long as possible, is a very important criterion. Due to the high number of teeth, the sprockets have relatively great diameters and need a large structural space, in particular for the drive station. This is how valuable space is lost in buildings. Due to great diameters, high driving moments are necessary, which entails higher cost for the drives.

From the state of the art, a number of further measures have been known for compensating the polygonal effect.

From WO 03/036129 A1, drives are known, which are capable of driving chains in a polygonally-compensated manner. This means that the drive sprocket is driven at a variable angular velocity in such a way that the chain driven by it runs at constant or near-constant velocity. Some of these polygonally-compensated chain drives work according to the principle that the effective length of the tight span is periodically varied.

DE 10 2006 036 353.1 A1 describes an escalator using a polygonally-compensated drive allowing a step chain/escalator chain to be operated with an increased chain pitch and with sprockets having a reduced number of teeth. In particular, the chain pitch is here 50%, or 100%, of the step pitch.

In practice however, there is the requirement over and above this, to make conveyors or escalators/moving sidewalks reversible, i.e. they must be able to run forwards and also backwards. For this purpose, a reversible chain drive, in particular a reversible drive means is required, which is capable of driving, for example, an escalator at a constant or near-constant velocity forwards as well as backwards. The approaches known from the state of the art for polygonal compensation cannot be used therefor, since they are always intended for one running direction.

To compensate the polygonal effect in the context of a reversible chain drive, solutions have already been suggested in the state of the art, however.

As described in DE 10 2006 036 353.1 A1, in the configuration of the chain drives or the conveyors, the interdependence of the number of teeth of the conveyor chain sprocket and the angle of wrap υ must be taken into consideration. Effective lever arms $H_{\mathit{eff}}$, $H_{\mathit{eff'}}$ of a sprocket must be essentially identical in the top span and the bottom span of the chain drive at all times and in all angular positions.

This results in the compensation behavior of the drive means having to be symmetrical. This means that if the effective radius of the compensation wheel in the top span is at a maximum, the effective radius in the bottom span must also be at a maximum—and vice versa. With a fixed arrangement of the compensation wheels, this means that the tensile force of the chain in the slack span varies greatly. In the invention according to WO 03/036129 A1, it is attempted to equalize the tensile force by means of spring biasing or at least not to let it drop below a certain minimum value. These springs are thus additionally required. First of all, they mean additional cost. Furthermore, the spring must be supported at a fixed point. To create this point of support also means additional work/cost. Furthermore, the structural space required therefor is not at all available in all fields of application. In the case of a spring breaking, there is the additional problem that the tensile force is decreased to an impermissible extent in the slack span—thus compromising the ruggedness.

In any case, running of a drive on this basis is accompanied by relatively strong transverse movements of the respective slack span. These can increase to vibrations under unfavorable operating parameters—the smooth running of the conveyor/the escalator could thus be adversely affected. Due to a great number of flexures of the pivoting levers (from joint to joint of the conveyor chain) the bearings could wear out relatively quickly and could be the origin of disturbing noises.

BRIEF SUMMARY OF THE INVENTION

It is thus the object of the present invention to provide a drive means which is suitable to drive a sprocket of a chain drive in such a way that polygonal compensation can be carried out both in a first and in a second, opposite, rotary direction.

This object is achieved by a drive means of the present invention.

The drive means according to the present invention ensures polygonal compensation in the two running directions in a particularly simple and very advantageous manner. Two non-circular compensation wheels are mounted on a common rocker. The rocker is pivotably mounted on a fixed pin. Depending on the rotary direction of the drive motor, or depending on the direction of the torque, the rocker is pivoted into the respective position. This is achieved completely automatically by the force component resulting from the tensile force of the tight span. The rectangular distance from the engagement of the compensation wheel to the center of the pin forms the corresponding lever arm. The product of force component and lever arm results in a torque, which effects pivoting of the rocker. Theoretically, the rocker is pivoted until the lever arm has become zero, or until the sum of the right-turning moments is equal to the sum of the left-turning moments. In this case, the slack span is practically tensioned by the tight span. With the aid of this relationship, proportional ratios of the force in the slack span to the force in the tight span result. This means that the slack span is tensioned depending on the load or the torque. This is ideal to ensure minimal wear of the pulling means and the pulling means wheels. Moreover, this arrangement offers the possibility to compensate the wear of the pulling means and the resulting length variation within certain limits.

Since pivoting of the rocker is automatic, hydraulic, electric, pneumatic or otherwise controlled or driven adjusting units or the like are not necessary. The springs indicated in WO 03/036129 A1 are not necessary either, which makes the drive simpler, more rugged and cost-effective.

Advantageous embodiments of the suggested drive means result from the features of the dependent claims. Particularly advantageous embodiments result as follows.

The bearing point provided by the pin for the rocker is preferably configured as a low-maintenance bearing with press-in sliding bearings of metal or polymeric material (e.g. plastic material). In particular the sliding bearings of polymeric material have the additional advantage that they reduce or isolate vibrations and dampen noise. Roller bearings are also conceivable, however.

There may be applications in which the position of the compensation wheel in the tight span must be defined absolutely in order, for example, to get as close to the ideal compensation effect as possible. In the present case, the maximum deflection of the rocker is limited by a pivoting angle limitation means, in particular at least one stop providing at least single action. Preferably, a double-acting stop is used. The limitation by the stop also has the advantage that possible micro movements of the rocker about the pin cannot arise, and thus wear and tear and joint corrosion (caused by micro movements), if any, of the bearing point provided by the pin for the rocker are avoided.

A further object of the present invention is to provide a polygonally-compensated chain drive having polygonally-compensated properties both in a first rotary direction and in a second rotary direction.

This object is achieved by a chain drive of the present invention.

Advantageous embodiments of the suggested chain drive can be derived from the features of the dependent claims.

Further features and advantages of the present invention can be seen from the following description of preferred exemplary embodiments with reference to the accompanying drawings, wherein:

Figure 1:
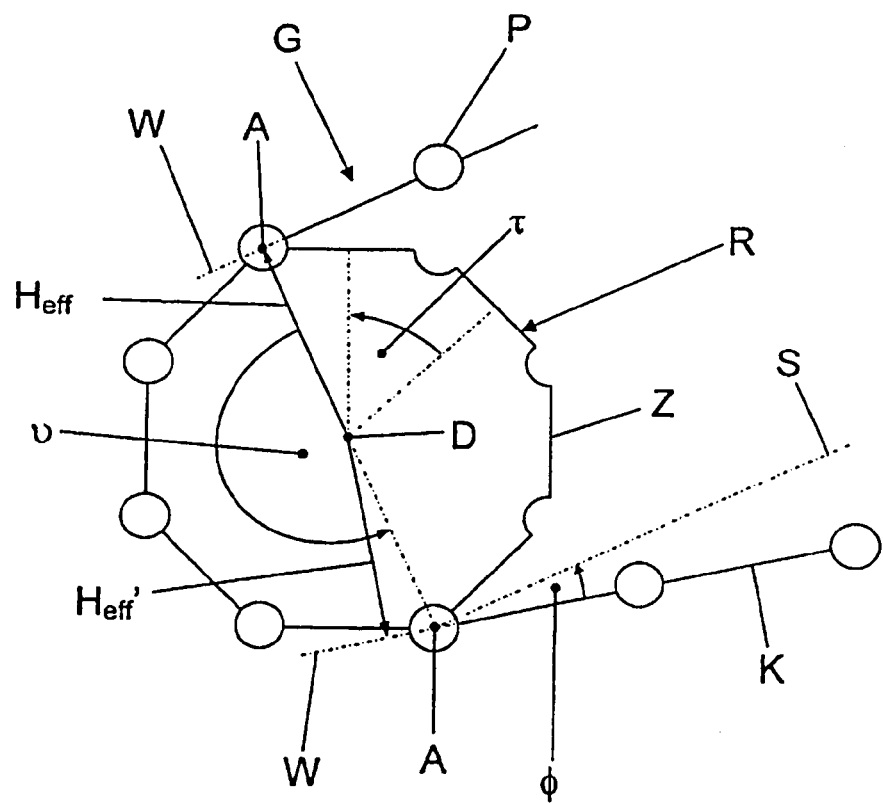
FIG. 1 is a schematic view of a sprocket to illustrate the polygonal effect.

The following reference numerals will be used in the drawings:

| | |
|---|---|
| G | sprocket chain |
| R | sprocket |
| K | chain link |
| P | pivot point |
| S | vertical |
| A | detachment point |
| D | rotary axis |
| $H_{eff}$ | effective lever arm |
| $H_{eff}$ | effective lever arm |
| 1 | first pulling means wheel |
| 2 | second pulling means wheel |
| 3 | pulling means |
| 4 | first compensation wheel |
| 5 | second compensation wheel |
| 6 | rocker |
| 7 | sprocket |
| 8 | pin |
| 31 | top span |
| 32 | bottom span |
| 41 | first running surface section |
| 42 | second running surface section |
| 43 | third running surface section |
| 44 | fourth running surface section |
| 45 | bearing (rotary axis) |
| 61 | first lever arm |
| 62 | second lever arm |
| 63 | rocker section |
| 64 | bore |
| 65 | elongate hole |
| 66 | stop |
| 67 | bore |
| 68 | geometrical axis "center of motor pinion" (first pulling means wheel 1) - "center of roller sprocket on the shaft of the conveyor sprocket" (second pulling means wheel 2) |
| 69 | geometrical center axis |
| $\phi$ | entry angle |
| $\upsilon$ | angle of wrap |
| $\tau$ | pitch angle |
| $r_{1n}$ | effective radius (distance) of the first compensation wheel between rotary axis and running surface |
| $r_{2n}$ | effective radius (distance) of the second compensation wheel between rotary axis and running surface |
| $\alpha_n$ | angular relationships of the rocker |
| $\beta_{1n}$ | rotation angle of the first compensation wheel |
| $\beta_{2n}$ | rotation angle of the second compensation wheel |
| $\lambda$ | angle of rotation of the compensation wheels to adapt to the direction of rotation |
| $\delta$ | pivoting angle of the rocker |

DESCRIPTION OF THE INVENTION

A drive means according to the present invention essentially comprises a first pulling means wheel 1, a second pulling means wheel 2, a pulling means 3, a first compensation wheel 4, a second compensation wheel 5 and a rocker 6.

A chain drive according to the present invention comprises at least one drive means according to the present invention and at least one sprocket 7, which is driven by the drive means. In particular, a chain drive according to the present invention comprises a conveyor chain, preferably a step chain or pallet chain, on which a number of escalator steps or pallets are mounted, and a further sprocket 70 that is usually not driven, wherein the conveyor chain runs on the sprocket 7 and the further sprocket 70.

The pulling means 3, such as a chain, preferably a roller chain, is wrapped around the first pulling means wheel 1 and the second pulling means wheel 2 in the manner of an endless chain. The result is a first section of the pulling means 3 not in contact with the pulling means wheels 1, 2, which is referred to as the top span 31 according to its usual position, and a second section of the pulling means 3 not in contact with the pulling means wheels 1, 2, which is referred to as the bottom span 32, also in accordance with its usual position. Preferably, the first pulling means wheel 1 is caused to rotate by a motor (not shown). In accordance with the resulting gear ratio, the second pulling means wheel 2 is caused to rotate by the wrapped-around pulling means 3 and, in turn, drives the sprocket 7. The sprocket 7 can be part of a chain drive, for example, in particular driving a conveyor chain, on which, in turn, individual steps or pallets are mounted. Escalators can be, in particular, escalators having steps as used, for example, in department stores, but also moving sidewalks with pallets as used, for example, in airports.

The compensation wheels 4, 5 have a non-circular shape deviating from the circular shape, and are provided with a bearing 45 for rotary connection with the rocker 6. The bearing 45 forms the rotary axis of the compensation wheels 4, 5. It can be preferably provided that the compensation wheels have a running surface with four running surface sections 41, 42, 43, 44, wherein the running surface sections 41, 42, 43, 44 preferably have a convex configuration. A running surface section thus essentially has a circular curvature, but does not have a common circle center point with the remaining running surface sections. It must be noted that the non-circular configuration of the compensation wheels 4, 5 is strongly exaggerated in the drawings—for illustrative purposes. In fact, the non-circular shape of the compensation wheels is substantially less pronounced than is suggested by the drawings. On a functional plane, a compensation wheel 4, 5 is adapted to provide a running surface for the pulling means 3. The effective radius r between the rotary axis 45 of each compensation wheel 4, 5 and the contacting pulling means 3 is a function of the angular position $\beta$ of the compensation wheel 4, 5. For illustrative purposes, two effective radii $r_{11}$ and $r_{12}$ of the first compensation wheel 4 and two effective radii $r_{21}$ and $r_{22}$ of the second compensation wheel 5 have been inscribed in the FIGS. 2 to 5. Exemplary angular positions $\beta_{11}$ and $\beta_{12}$ of the first compensation wheel 4 and exemplary angular positions $\beta_{21}$ and $\beta_{22}$ of the second compensation wheel 5 are further shown. For FIG. 2 and FIG. 3, the following exemplary relationship results:

| First compensation wheel | First compensation wheel | Second compensation wheel | Second compensation wheel |
|---|---|---|---|
| $\beta_{11} = 0°$ | $r_{11}$ with $r_{11} > r_{12}$ | $\beta_{21} = 0°$ | $r_{21}$ with $r_{21} < r_{22}$ |
| $\beta_{12} = 45°$ | $r_{12}$ with $r_{12} < r_{13}$ | $\beta_{22} = 45°$ | $r_{22}$ with $r_{22} > r_{23}$ |
| ... | ... | ... | ... |
| $\beta_{1n} = 360°$ | $r_{1n}$ with $r_{1n} > r_{1n+1}$ | $\beta_{2n} = 360°$ | $r_{2n}$ with $r_{2n} < r_{2n+1}$ |

It can be seen from the table and also from the drawings, that it is essentially a question of providing a compensation wheel 4, 5 which depending on the rotary angle position β has a running surface with different radii (distances) r with respect to the center of rotation. Insofar the shape illustrated here is only of an exemplary nature. Other compensation wheel shapes are also conceivable, such as involute curve shapes.

It must be noted that the compensation wheels, in particular their running surfaces, are only described in a very schematic manner. Preferably, the compensation wheels are wheels that should come into form closure with the pulling means. Preferably, toothed wheels could be used so that the running surface essentially coincides with the pitch circle diameter of the toothed wheel. A compensation wheel 4, 5 configured as a toothed wheel thus has different pitch diameters.

The rocker 6 is essentially in the shape of a Y. The rocker thus has a first lever arm 61, a second lever arm 62 and a further rocker section 63. The first lever arm 61 and the second lever arm 62 are aligned at an obtuse angle $\alpha_1$ with respect to each other. A reflex angle $\alpha_2$ and $\alpha_3$ is provided between the first lever arm 61 and the rocker section 63 and the second lever arm 62 and the rocker section 63, respectively. A bore 67 to receive the rocker 6 on a fixed pin 8 in a rotary manner is provided between the lever arms 61 and 62 and preferably at the intersection of the longitudinal axes of the lever arms 61, 62. The pin 8 and the bore 67 thus form a bearing which allows the rocker to be pivoted about a pivoting axis extending in the longitudinal direction of the pin 8. Furthermore, the pin 8 is preferably positioned on a geometrical axis "center of motor pinion" (first pulling means wheel 1)—"center of roller sprocket on the shaft of the conveyor sprocket" (second pulling means wheel 2). The above-mentioned geometrical axis is indicated by reference numeral 68 in the figures. Furthermore, the first lever arm 61 and the second lever arm 62, on their free ends, are each provided with a bearing means, in particular a pin, to receive each compensation wheel 4, 5 in a rotary manner. The bore 45 of the compensation wheels 4, 5 is thus part of the bearing means. The rocker section 63 is provided with a bore 64. The further bore 64 basically enables the rocker 6 to be installed in an alternative position on the pin 8. The bore 64 and the pin 8 thus form an alternative bearing. In principle, it is also conceivable to provide further bores in the rocker 6 and thus also further alternative positions of the rocker 6. By these means, various bearing points are created which result, in particular, in various geometrical relationships between the pivoting axis, the receiving points (rotary axis 45) of the compensation wheels 4, 5 and the pulling means wheels 1, 2. The desired rotary angle λ of the compensation wheels 4, 5 can be adjusted, in particular, by the position of the bearing with respect to the rotary axes 45 of the compensation wheels 4, 5. It can be ensured that the compensation wheels 4, 5 are rotated about the rotation angle λ as the rocker 6 is rotated about the pivoting angle δ. Determination of the position of the bearing of the rocker is essentially carried out in an iterative manner. As a given quantity, the desired angle of rotation λ of the compensation wheels 4, 5 is known. This desired angle of rotation λ can be adjusted in various ways. If the rocker is predetermined in its configuration and if the pivoting angle δ of the rocker 6 is also predetermined, the angle of rotation λ can be adjusted, for example, by changing the position of the bearing of the rocker 6. Of course, other parameter changes could also be made to adjust the desired angle of rotation λ, such as the shape and/or dimensions of the rocker 6 and/or the pivoting angle δ, and/or the angles $\alpha_1$, $\alpha_2$ or $\alpha_3$, and/or the distance between the pin 8 and each center of the compensation wheels 4, 5 etc. It has become apparent, however, that the positioning of the bearing of the rocker 6 is the simplest approach to carry out an adjustment of the desired angle of rotation λ. To provide the rocker with a number of bores 64, 67 is a particularly simple approach to change the position of the bearing by changing the position between bore 67 and bore 64. A fine adjustment can then be carried out by positioning the pin 8.

It must be noted that the bores 64, 67, or the center points of the bores are arranged on a center axis 69. The center axis 69 is thus a line on which preferably further bores can be arranged to receive the rocker 6 on the pin 8. Furthermore, it must be noted that a V-shaped, T-shaped, for example, or even a straight configuration of the rocker is also possible. The most important thing is that the desired angle of rotation λ of the compensation wheels can be achieved by pivoting the rocker 6.

The rocker 6 is further provided with a pivoting angle limitation means. The pivoting angle limitation means essentially and preferably comprises an elongate hole 65 in the rocker 6 and a fixed stop 66.

The function of the drive means of the present invention or the chain drive according to the present invention is as follows.

Figure 2:
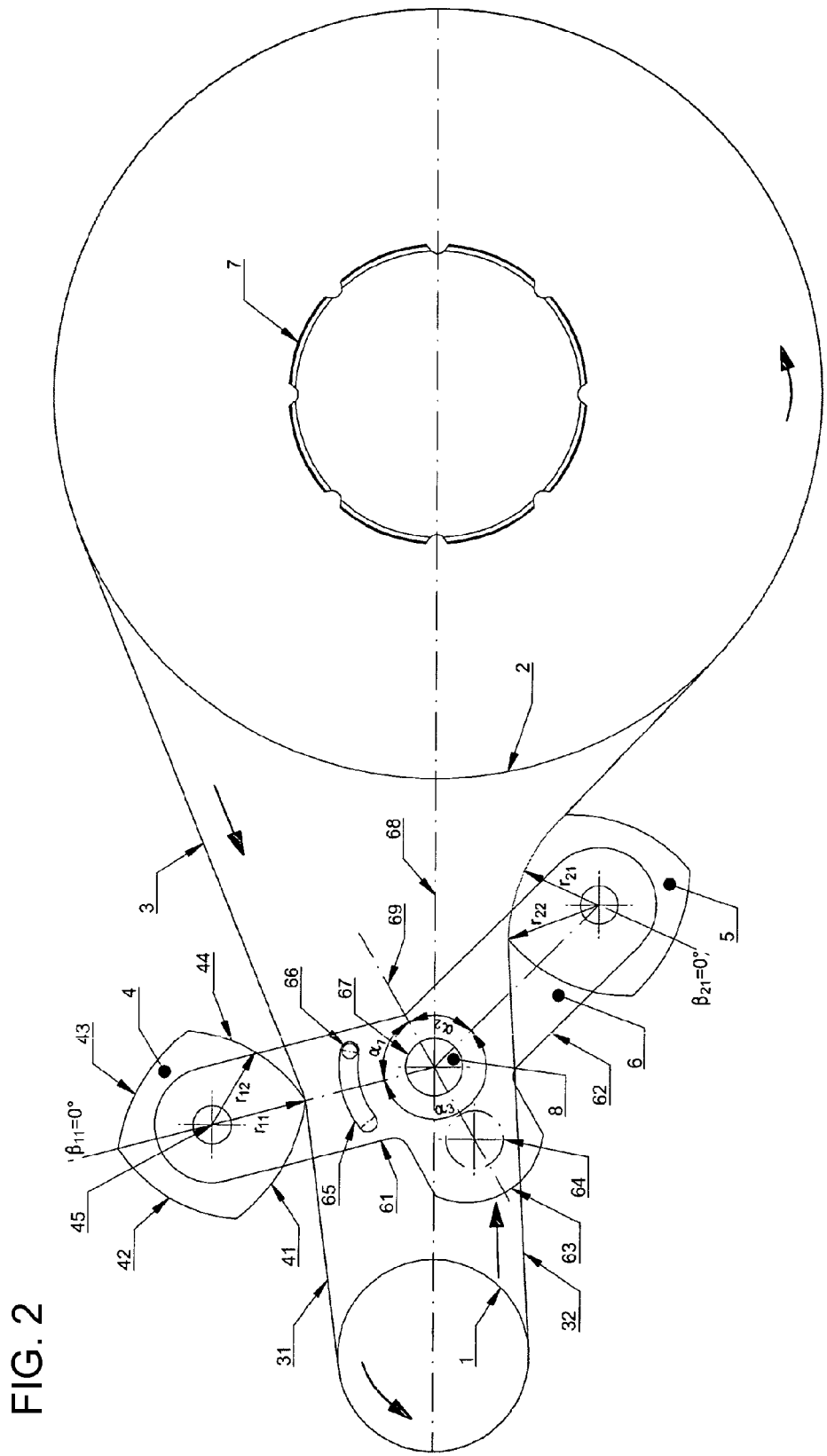
FIG. 2 is a schematic view of a drive means according to the present invention in a first movement direction of the pulling means (indicated by the arrows) with a first rotary position of the compensation wheels ($\beta_{11}=0°$; $\beta_{21}=0°$) and a first position of the rocker.
Figure 3:
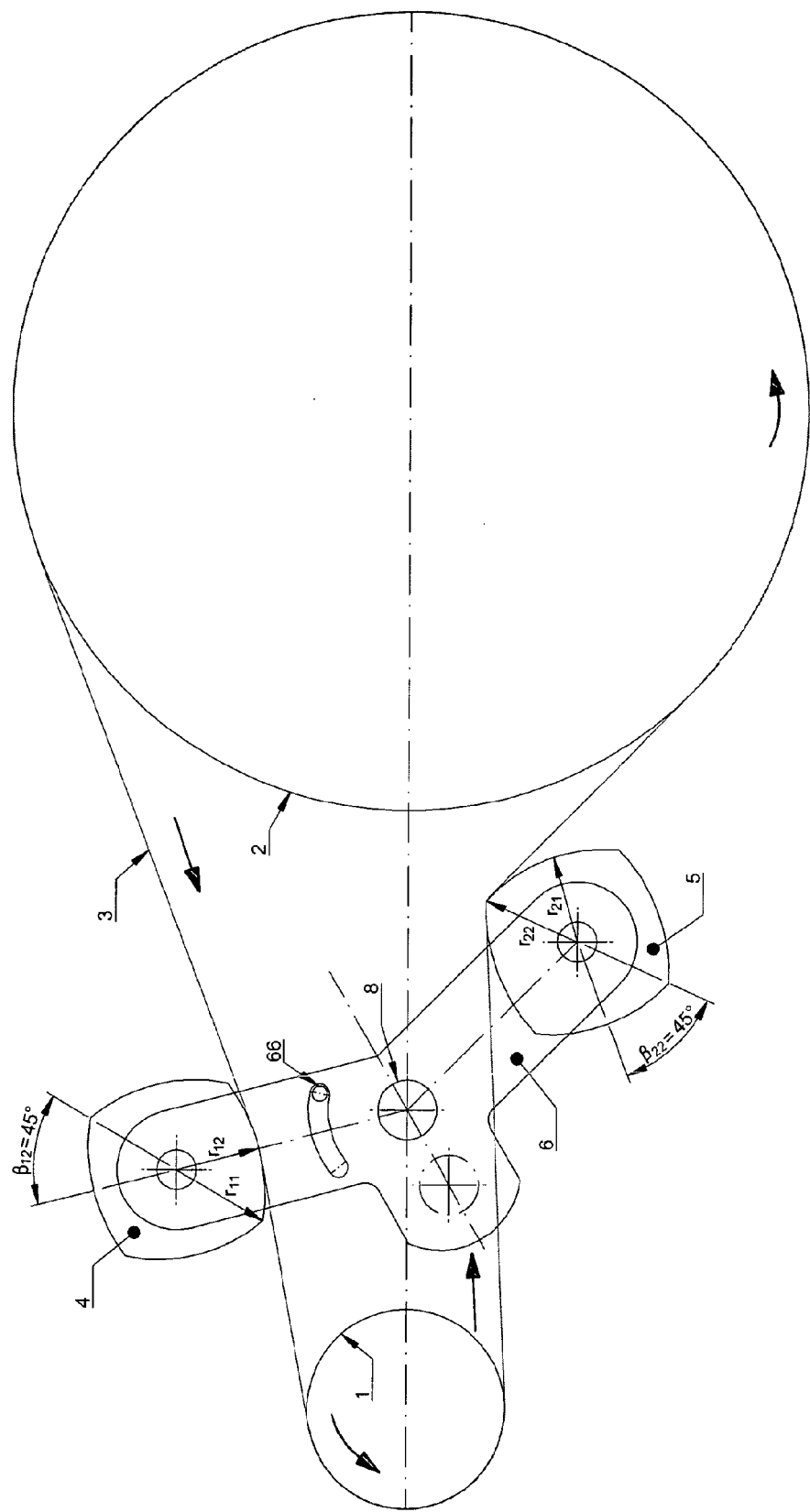
FIG. 3 is a schematic view of a drive means according to the present invention in a first movement direction of the pulling means with a second rotary position of the compensation wheels ($\beta_{12}=45°$; $\beta_{22}=45°$) and a first position of the rocker.

In a first direction of rotation of the pulling means wheels 1, 2 and the direction of movement of the pulling means 3 resulting therefrom, the pulling means wheels and the compensation wheels rotate, or the pulling means moves, as indicated by the arrows in the FIGS. 2 and 3. For this case of direction of movement, the top span 31 of the pulling means 3 is the pulling span, i.e. the tight span, and the bottom span 32 of the pulling means 3 is the pulled span, i.e. the slack span.

The compensation wheels 4, 5 have a direct effect on each of the contacting sections of the pulling means 3. In the case of the first compensation wheel 4, this is the top span 31, and in the case of the second compensation wheel 5, this is the bottom span 32. The effect is in the form of a displacement of each pulling means section in dependence on the rotary angle position β of the compensation wheel 4, 5.

For illustrative purposes, two different rotation angle positions β of the compensation wheels 4, 5 are shown in each of FIGS. 2 and 3. From a combined view of FIGS. 2 and 3 it can be seen that as the first compensation wheel 4 is rotated from β=0° to 45°, it has displaced the section of the top span 31 contacting the running surface section by the difference between the radii $r_{11}$ and $r_{12}$ (FIG. 2 to FIG. 3). The distance between the rotary axis 45 of the second compensation wheel 5 and the bottom span 32 contacting the running surface has also been changed, from $r_{21}$ to $r_{22}$ (FIG. 2 to FIG. 3).

The alternating displacement of top span 31 and bottom span 32 in the manner suggested results in the tensioning of the top span 31 coinciding with relaxing of the bottom span 32 and relaxing of the top span 31 coinciding with tensioning of the bottom span 32 in an alternating fashion. The rocker 6 and the compensation wheels 4, 5 thus form a tensioning means for the pulling means 3. The shape of the running surfaces of the compensation wheels 4, 5 results, of course, in intermediate distances r(β) which depend on the geometry of each compensation wheel 4, 5. In principle, however, top span 31 and bottom span 32 are alternately tensioned and relaxed as soon as the driving means is operated.

The following effect results from the use of the compensation wheels 4, 5. As far as it can be expected that the first pulling means wheel 1 is driven at a constant angular velocity (rotation speed), the second pulling means wheel 2 rotates at a non-constant angular velocity. This effect is due to the fact that the top span 31 is lengthened by tensioning and the bottom span 32 is shortened by relaxation, or the top span 31 is shortened by relaxation and the bottom span 32 is lengthened by tensioning. The angular velocity of the second pulling means wheel 2, plotted as a function of time, in the broadest sense corresponds to a cosine function with a continual change between maximum and minimum angular velocity. If the second pulling means wheel 2 is driven in such a manner, the sprocket 7 of a chain drive, in particular an escalator, can in turn be driven in such a way that the escalator/the moving sidewalk, in particular their steps or pallets, move at a constant or near-constant velocity. When the shorter effective lever arm $H_{\mathit{eff}}$ determines the velocity of the driven roller chain, the rotation speed of the second pulling means wheel 2 is increased and when the longer effective lever arm $H_{\mathit{eff}}$ determines the velocity of the driven roller chain, the rotation speed of the second pulling means wheel 2 is reduced. By these means, the initially described polygonal effect is countered with the result that the roller chain moves at a near-constant velocity.

To compensate the polygonal effect, basically it is necessary to adapt the driving means to the sprocket, or the chain drive, in such a way that the change in the rotation velocity of the second pulling means wheel 2 is tuned to the change in the lever arm of the sprocket 7. The measures needed for this are known to the person skilled in the art. Basically, however, the tuning is for one direction of rotation of the sprocket 7, or the upstream components of the drive means. If the direction of rotation is reversed, polygonal compensation is no longer possible in chain drives known from the state of the art. Rather, the case can arise, where the polygonal effect is even increased and the roller chain moves with considerable velocity fluctuations.

In the chain drive according to the present invention, in particular in the drive means, if the effective radius $r_{1n}$ of the compensation wheel 4 is at a maximum in the top span 31, the effective radius $r_{2n}$ is at a minimum in the bottom span—and vice versa. Despite this, a symmetrical compensation behavior is present. This means that, if the direction of rotation of the drive motor is reversed, or if the torque is reversed, the tight and the slack span are exchanged and the compensation effect continues to work correctly.

This is achieved by rotating the compensation wheels 4, 5 about a predetermined angle, in particular by rotating them about an angle of rotation λ. As the direction of rotation is reversed, the rocker 6 is pivoted about a pivoting angle δ. Due to form closure between the compensation wheels 4, 5 and the pulling means 3 (preferably a roller chain), they are rotated about a predetermined angle λ in a defined manner. This rotation of the compensation wheels 4, 5 is exceedingly favorable, because the effective radii $r_{1n}$ and $r_{2n}$ are changed thereby and a compensating effect, necessary for the new direction of rotation, comes about. There is the additional advantage that the tension of the slack span is almost ideally equalized. By mounting the compensation wheels 4, 5 on a common rocker 6 which in turn is supported on a pin 8, an extremely simple, automatically adjusting, rugged and cost-effective drive means or chain drive results, with the additional advantage that the pulling means 3, in particular the chain, is uniformly, or near-uniformly, tensed at all times or with all angular positions of the pulling means wheels 1, 2. For attachment, only a point is needed on the drive means, on which the pin 8 can be fixed for the bearing of the rocker 6. Moreover, this drive means only needs little structural space—its structure is extremely compact.

The angle of rotation λ of the compensation wheels 4, 5 and the mounting of the rocker 6 can be determined, in particular, by means of the following calculations.

The required angle of rotation λ of the compensation wheels 4, 5 is calculated as follows: half of the angular pitch of the conveyor sprocket 7 is multiplied by the number of teeth of the pulling means wheel 2 on the shaft of the conveyor sprocket 7, divided by the number of teeth of the compensation wheels 4, 5. This value is the angle λ about which—as the direction of rotation or the torque is reversed—the compensation wheels 4, 5 must be rotated. Each of the two compensation wheels 4, 5—independently viewed—is practically rotated about the value λ.

In the present example, the angle of rotation λ is about 45°, which in turn corresponds to the angle between $\beta_{11}$ and $\beta_{12}$, and $\beta_{21}$ and $\beta_{22}$, which, again, results from the angle between adjacent $r_{11}$ and $r_{12}$, and $r_{21}$ and $r_{22}$, respectively, i.e. the angle between the maximum radius and the minimum radius of the non-circular compensation wheel.

To achieve exactly this angle of rotation λ, the position of the pin 8, about which the rocker 6 is pivoted, is positioned within the rocker 6 on the indicated center axis 69 of the rocker 6 in such a manner that as the direction of rotation is changed, a corresponding angle of rotation λ results for the compensation wheels 4, 5. The exact place on the axis, where the point has its optimal position, is determined by the person skilled in the art by means of graphics or computation.

Figure 4:
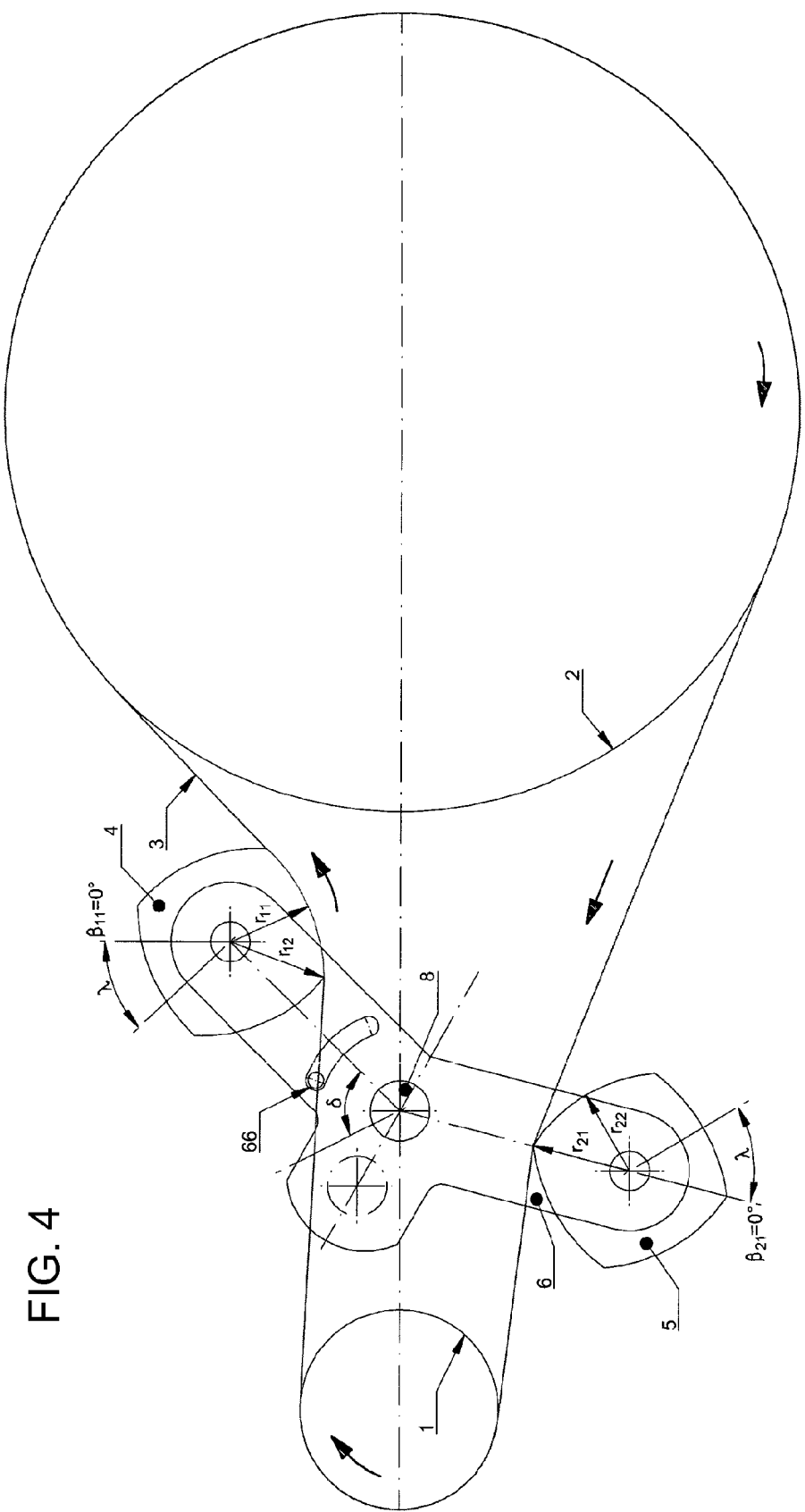
FIG. 4 is a schematic view of a drive means according to the present invention in a second, opposite movement direction of the pulling means with a first rotary position of the compensation wheels ($\beta_{11}=0°$; $\beta_{21}=0°$), taking the rotary angle λ of the compensation wheels into account and a second position (rotation about an angle δ with respect to the position according to FIGS. 2 and 3) of the rocker.
Figure 5:
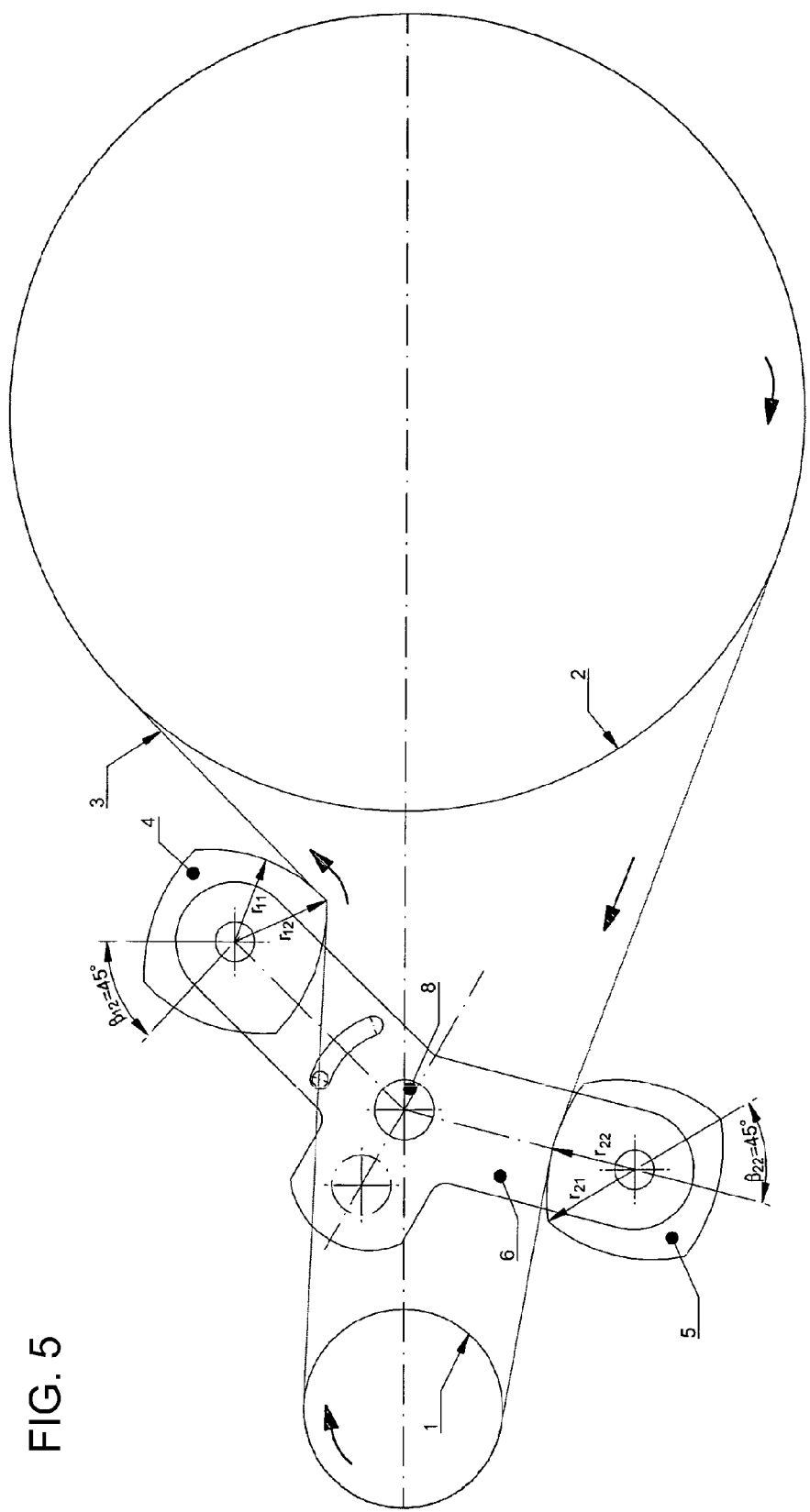
FIG. 5 is a schematic view of a drive means according to the present invention in a second, opposite movement direction of the pulling means with a second rotary position of the compensation wheels ($\beta_{12}=45°$; $\beta_{22}=45°$) and a second position (rotation about the angle $\delta$ with respect to the position according to FIGS. 2 and 3) of the rocker.
Figure 6:
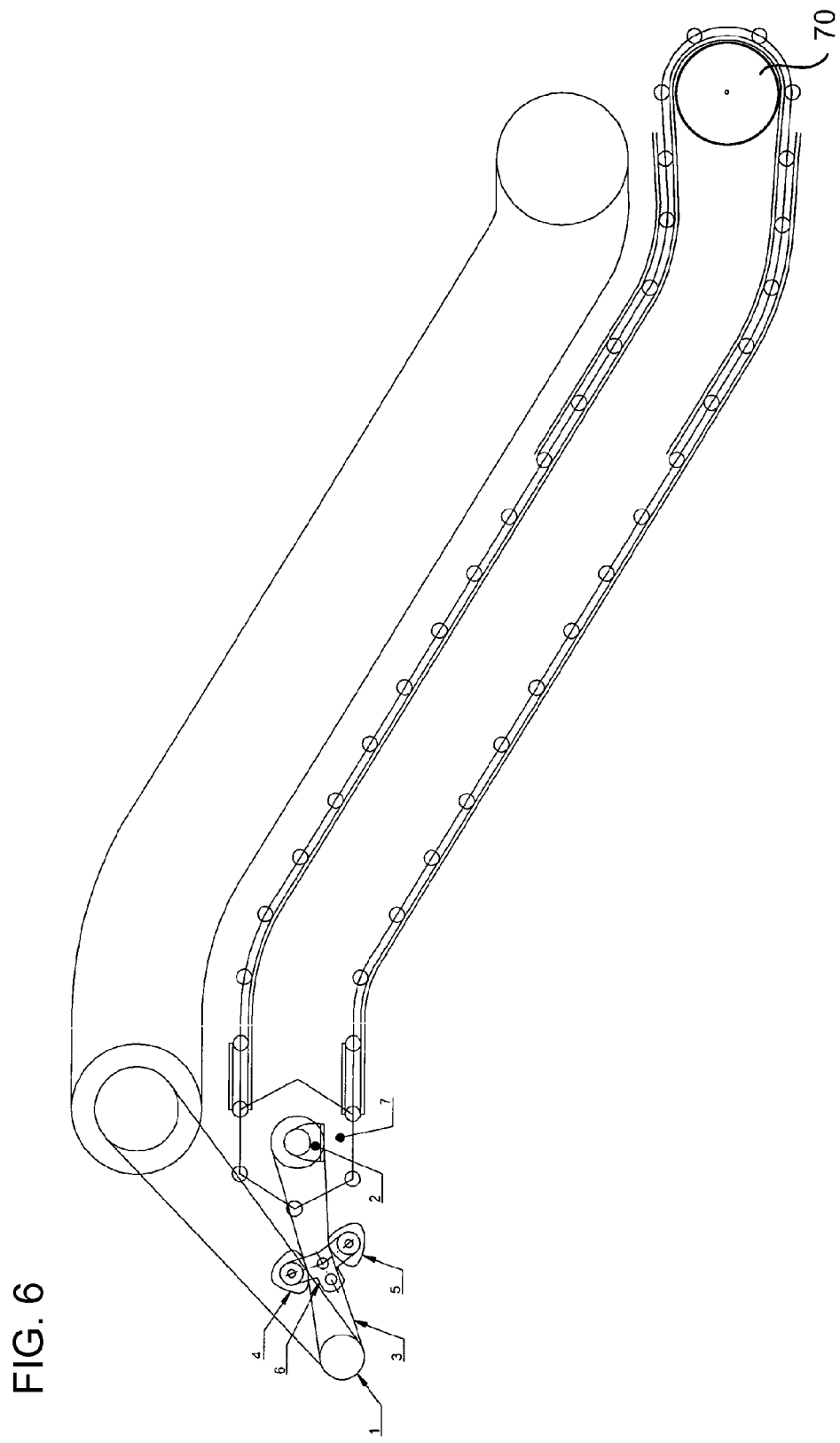
FIG. 6 is a schematic view of a chain drive according to the present invention, in particular a conveyor chain drive.

For illustrative purposes, a drive means for a chain drive is shown in FIGS. 4 and 5 with the direction of rotation reversed with respect to FIGS. 2 and 3. The rocker 6 has been pivoted about a pivoting angle δ with respect to the state according to FIGS. 2 and 3. This results in the angle of rotation λ of the compensation wheels 4, 5 required to maintain the polygonal compensation with the direction of rotation reversed. The first compensation wheel 4 now acts on the slack span of the drive means, which is now formed by the top span 31. The second compensation wheel 5 now acts on the tight span, which is now formed by the bottom span 32. Otherwise, the explanations given with reference to FIGS. 2 and 3 can be referred to. The opposed tensioning and relaxing of top span 31 and bottom span 32 basically continues in the above illustrated manner.

To ensure the function of the rocker 6 as the direction of rotation is reversed, i.e. to maintain tensioning of the drive chain, tensioning elements known from the state of the art can be added as needed.

The present invention can be described, in particular, as a chain drive, comprising a driven sprocket, a drive means for the polygonally-compensated drive of the sprocket, wherein the drive means comprise two pulling means wheels 1, 2, a pulling means 3 running on them, and moveable tensioning means, which is characterized in particular in that the tensioning means change the effective length of the tight span depending on the direction of rotation of the pulling means either by acting on the tight span of the pulling means, or by acting on the slack span of the pulling means, to change the effective length of the slack span.

Furthermore, the present invention is characterized in particular in that the tensioning means comprise a pivotable rocker 6, furthermore in particular in that the tensioning means comprise two non-circular compensation wheels 4, 5 mounted on the rocker 6, furthermore in particular in that a first one of the compensation wheels 4 can come into engagement with the tight span of the pulling means, whereas the second one of the compensation wheels 5 can come into engagement with the slack span of the pulling means.

The invention claimed is:
1. A chain drive comprising:
a sprocket;
a drive for driving said sprocket;

a further sprocket;
a conveyor chain wrapped around said sprocket and said further sprocket, said conveyor chain being provided with a plurality of attachment parts, said attachment parts being escalator steps or pallets;
said drive being configured for a polygonally-compensated driving of said sprocket, said drive including:
two pulley wheels;
a pulling device running on said two pulley wheels with an upper run and a lower run; and
a tensioning device disposed to act on said pulling device, said tensioning device including:
a first non-circular compensation wheel disposed to come into contact with said upper run;
a second non-circular compensation wheel disposed to come into contact with said lower run;
a rocker rotatably supporting said first compensation wheel and said second compensation wheel; and
a fixed bearing pivotally supporting said rocker.

2. The chain drive according to claim 1, wherein said compensation wheels include a rotary axis and a running surface for said pulling device, wherein at least a first radius is defined between the rotary axis and the running surface and a second radius is defined between the rotary axis and the running surface, and the first radius is different from the second radius.

3. The chain drive according to claim 1, wherein said compensation wheels have at least one running surface section, wherein at least a first radius is defined between the rotary axis and the running surface section and a second radius is defined between the rotary axis and the running surface section, and wherein the first radius is different from the second radius.

4. The chain drive according to claim 3, wherein said running surface section is one of four running surface sections.

5. The chain drive according to claim 4, wherein said running surface sections have a convex configuration.

6. The chain drive according to claim 1, wherein said compensation wheels are toothed wheels and wherein a running surface or a running surface section for said pulling device corresponds to a pitch circle of said toothed wheel.

7. The chain drive according to claim 1, wherein said first compensation wheel and said second compensation wheel are substantially identical wheels.

8. The chain drive according to claim 1, wherein said rocker has a first lever arm and a second lever arm, said first compensation wheel is rotatably mounted to an end of said first lever arm and said second compensation wheel is rotatably mounted to an end of said second lever arm, and said bearing for pivotally mounting said rocker is disposed between said lever arms.

9. The chain drive according to claim 1, wherein said bearing comprises a pin and a bore formed in said rocker.

10. The chain drive according to claim 9, wherein said pin is disposed on a geometrical axis extending between said rotary axes of said first pulley wheel and said second pulley wheel.

11. The chain drive according to claim 9, wherein said rocker is formed with at least one further bore, and wherein said further bore together with said pin defines an alternative position of said bearing.

12. The chain drive according to claim 11, wherein further possible bores for pivotally receiving the rocker on said pin can be provided on a center axis extending through center points of said further bore and said bore.

13. The chain drive according to claim 9, which comprises a pressed-in sliding bearing of metal or polymeric material between said pin and said rocker.

14. The chain drive according to claim 1, wherein said rocker is pivotable on said bearing about a pivoting angle, wherein said bearing, said rocker, said compensation wheels, and said pulling device are configured such that, when said rocker is pivoted about said pivoting angle, a rotation of said compensation wheels about an angle of rotation arises.

15. The chain drive according to claim 1, wherein said rocker includes a pivoting angle limiter.

16. The chain drive according to claim 15, wherein said pivoting angle limiter is an elongate hole formed in said rocker and including a fixed stop.

17. The chain drive according to claim 1, wherein a pivoting motion of said rocker is triggered by a reversal of a direction of rotation and/or a reversal of a torque of said pulley wheels.

18. The chain drive according to claim 1, wherein said pulling device is a form-closed pulling device.

19. The chain drive according to claim 18, wherein said pulling device is a chain.

20. The chain drive according to claim 18, wherein said pulling device is a roller chain.

21. The chain drive according to claim 1, wherein an angle of rotation of said compensation wheels corresponds to half a pitch angle of said sprocket, multiplied by a number of teeth of said pulley wheel coupled with said sprocket, divided by a number of teeth of said compensation wheels.

22. A drive assembly comprising:
a sprocket;
a drive for driving said sprocket;
said drive being configured for a polygonally-compensated driving of said sprocket, said drive including:
two pulley wheels;
a pulling device running on said two pulley wheels with an upper run and a lower run; and
a tensioning device disposed to act on said pulling device, said tensioning device including:
a first non-circular compensation wheel disposed to come into contact with said upper run;
a second non-circular compensation wheel disposed to come into contact with said lower run;
a rocker rotatably supporting said first compensation wheel and said second compensation wheel; and
a fixed bearing pivotally supporting said rocker.

* * * * *